US008185914B2

(12) United States Patent
Dawra et al.

(10) Patent No.: US 8,185,914 B2
(45) Date of Patent: May 22, 2012

(54) USER-CONFIGURABLE VARIABLES

(75) Inventors: Anshul Dawra, San Jose, CA (US); Swaminathan Gounder, San Jose, CA (US); Sherry Guo, Fremont, CA (US); Paul A. Ostler, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1307 days.

(21) Appl. No.: 11/614,952

(22) Filed: Dec. 21, 2006

(65) Prior Publication Data

US 2008/0155573 A1    Jun. 26, 2008

(51) Int. Cl.
*G06F 9/44*     (2006.01)
*G06F 9/46*     (2006.01)

(52) U.S. Cl. .......................................... 719/320; 717/108
(58) Field of Classification Search ................... 719/320
See application file for complete search history.

(56) References Cited

U.S. PATENT DOCUMENTS

| | | | | |
|---|---|---|---|---|
| 6,085,035 | A * | 7/2000 | Ungar | 717/116 |
| 6,430,609 | B1 | 8/2002 | Dewhurst et al. | |
| 6,629,113 | B1 | 9/2003 | Lawrence | |
| 6,845,503 | B1 | 1/2005 | Carlson et al. | |
| 7,369,117 | B2 * | 5/2008 | Evans et al. | 345/156 |
| 7,593,944 | B2 * | 9/2009 | Rogers et al. | 1/1 |
| 2004/0268301 | A1 * | 12/2004 | Kaston | 717/108 |

OTHER PUBLICATIONS

C.S Adjiman, IP Androulakis and CA Floudas ; "A global optimization method, for general twice_differenriable constrained NPLs Implementation and computational results" , 1998.*
Reidar Conradi and Bernhard Westfechtel, Version Models for Software Configuration Management, ACM Computing Surveys, vol. 30, No. 2, Jun. 1998.
Jean Berstel, et al., A Scalable Formal Method for Design and Automatic Checking of User Interfaces, ACM Transactions on Software Engineering and Methodology, vol. 14, No. 2, Apr. 2005, pp. 124-167.

* cited by examiner

*Primary Examiner* — Lechi Truong
*Assistant Examiner* — Abdou Seye
(74) *Attorney, Agent, or Firm* — Sawyer Law Group, P.C.

(57) ABSTRACT

A method and a computer program product for managing user-configurable variables are provided. The method and the computer program product provide for defining a plurality of user-configurable variables in a computer program, providing an interface operable to be utilized in the computer program for each of the plurality of user-configurable variables, creating an instance of the interface in the computer program for each of the plurality of user-configurable variables, incorporating code for implementing each of the plurality of user-configurable variables into at least one method in the instance of the interface created for the user-configurable variable, and defining a function in the computer program operable to configure any of the plurality of user-configurable variables according to a provided user specification.

5 Claims, 4 Drawing Sheets

USER-CONFIGURABLE VARIABLES

FIELD OF THE INVENTION

The present invention relates generally to user-configurable variables.

BACKGROUND OF THE INVENTION

User-configurable variables (i.e., variables that can be set by a user at runtime) are often defined in computer programs. When user-configurable variables are defined in a computer program, the computer program is usually written in such a way that each time the computer program is executed, all user-configurable variables are checked to determine whether or not any user-configurable variable needs to be set or configured based on configuration information provided by a user.

Checking all user-configurable variables for each execution of the computer program, however, is inefficient if only a small percentage of the user-configurable variables are set by a user. Additionally, the approach is error-prone because each time a new user-configurable variable is defined in the computer program, the computer program must be modified so that the newly defined user-configurable variable will be checked along with all of the other user-configurable variables when the computer program is executed. If the computer program is not modified accordingly, then the newly defined user-configurable variable will not be checked at runtime and, as a result, may not be configured correctly.

SUMMARY OF THE INVENTION

A method and a computer program product for managing user-configurable variables are provided. The method and the computer program product comprise defining a plurality of user-configurable variables in a computer program, providing an interface operable to be utilized in the computer program for each of the plurality of user-configurable variables, the interface comprising one or more methods, creating an instance of the interface in the computer program for each of the plurality of user-configurable variables, incorporating code for implementing each of the plurality of user-configurable variables into at least one of the one or more methods in the instance of the interface created for the user-configurable variable, and defining a function in the computer program that is operable to configure any of the plurality of user-configurable variables according to a provided user specification, the provided user specification specifying configuration information for one or more of the plurality of user-configurable variables, wherein, for each of the one or more user-configurable variables specified in the provided user specification, the function is operable to execute the instance of the interface created for the specified user-configurable variable to implement the specified user configurable variable.

DETAILED DESCRIPTION

The present invention relates generally to user-configurable variables. The following description is presented to enable one of ordinary skill in the art to make and use the invention and is provided in the context of a patent application and its requirements. The present invention is not intended to be limited to the implementations shown, but is to be accorded the widest scope consistent with the principles and features described herein.

In computer programming, user-configurable variables are frequently defined or declared in a computer program to allow users to set or configure the user-configurable variables at runtime. Thus, a value associated with each user-configurable variable can change from one execution of the computer program to another.

With object-oriented programming languages, such as C++ and Java, user-configurable variables may be defined within classes. A class is an object that describes common properties, operations, and behavior of objects instantiated from the class. Objects instantiated from the class are also referred to as instances of the class. The common properties, operations, and behavior are described by defining variables and methods in the class.

When user-configurable variables are defined in a computer program, a function is typically defined in the computer program to configure or set the user-configurable variables in accordance with configuration information provided by users. Typically, for each execution of the computer program, the function will check every user-configurable variable defined in the computer program to determine whether any user configurable variable needs to be set or configured according to configuration information provided by a user.

Figure 1:
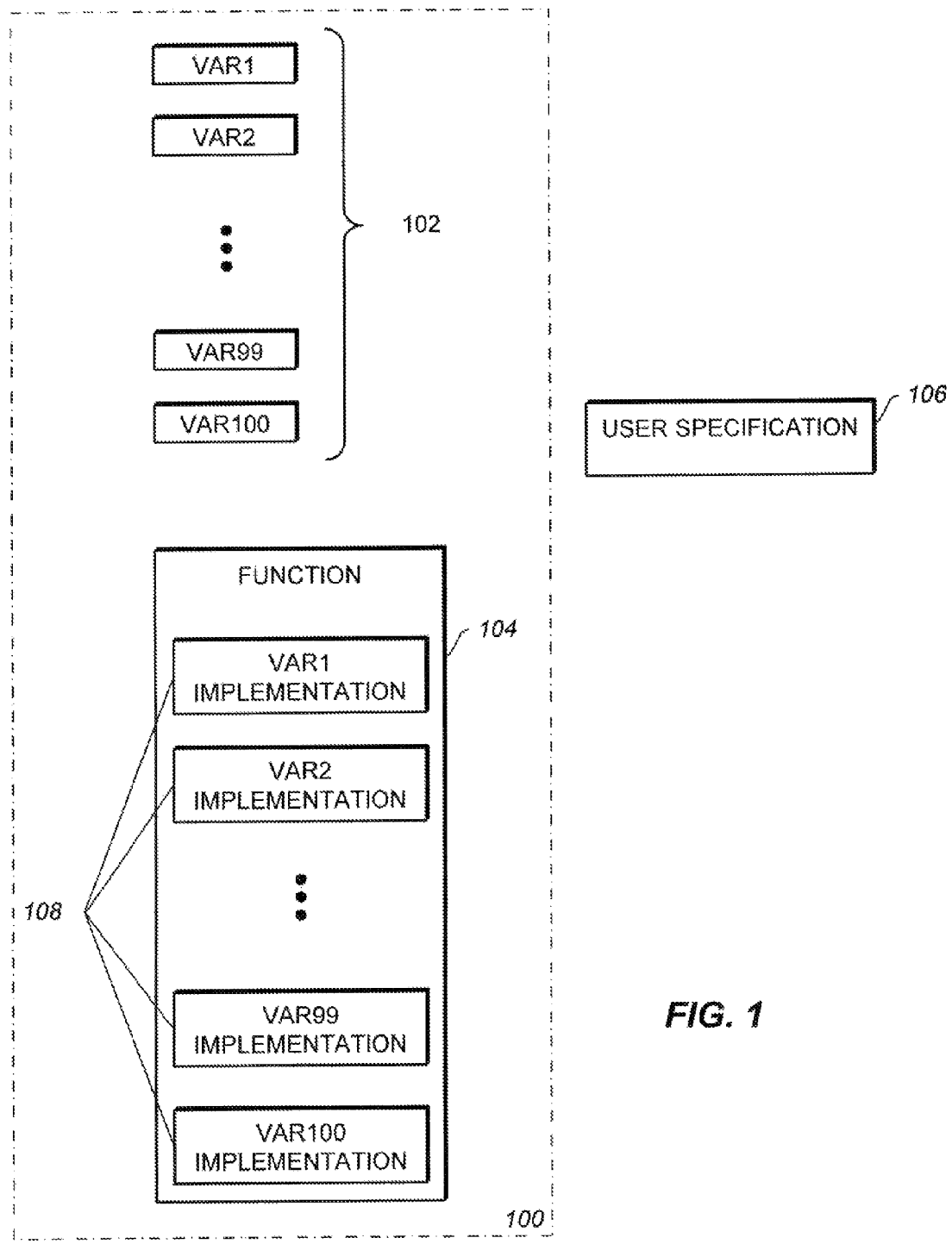
FIG. 1 depicts a block diagram of a sample computer program.

Depicted in FIG. 1 is a block diagram of a sample computer program 100. In FIG. 1, one hundred user-configurable variables 102 have been defined in sample computer program 100. A function 104 has also been defined in sample computer program 100. Upon execution of sample computer program 100, function 104 will configure user-configurable variables 102 based on configuration information specified in a provided user specification 106.

Function 104 includes implementation code 108 for each of the user-configurable variables 102. Implementation code 108 for each of the user-configurable variables 102 may include special handling code for the particular user-configurable variables 102. For instances, implementation of a user-configurable variable may require verification that certain conditions are satisfied (e.g., variable length is within a set limit).

Presented below is an example of pseudo-code for function 104 in FIG. 1. In the example, function 104 is name "setVariables" and the provided user specification 106 is named "properties". Methods "getVariableXX" are defined for each user-configurable variable 102 to check whether configuration information has been specified in provided user specification 106.

```
void setVariables (Properties properties)
{
    var1 = getVariable1 (properties);
    var2 = getVariable2 (properties);
```

-continued

```
    if (cond1 && cond2) {
        // special handling for var2
    }
    else {
        // do something else
    }
    ...
    ...
    var99 = getVariable99 (properties);
    var100 = getVariable100 (properties);
}
```

As seen from FIG. 1 and the example above, function 104 will check every user-configurable variable, regardless of whether or not configuration information for the user-configurable variable is specified in the provided user specification 106. This can be very inefficient if only a small percentage of the total number of user-configurable variables 102 are actually set based on the provided user specification 106.

In addition, each time a new user-configurable variable is defined in the sample computer program 100, function 104 will need to be modified to include implementation code for the newly defined user-configurable variable. Further, each time one of the user-configurable variables 102 is removed from sample computer program 100, function 104 will need to be modified to remove implementation code 108 corresponding to the removed user-configurable variable 102. Hence, errors can occur if function 104 is not modified accordingly each time a user-configurable variable is added or removed.

Figure 2:
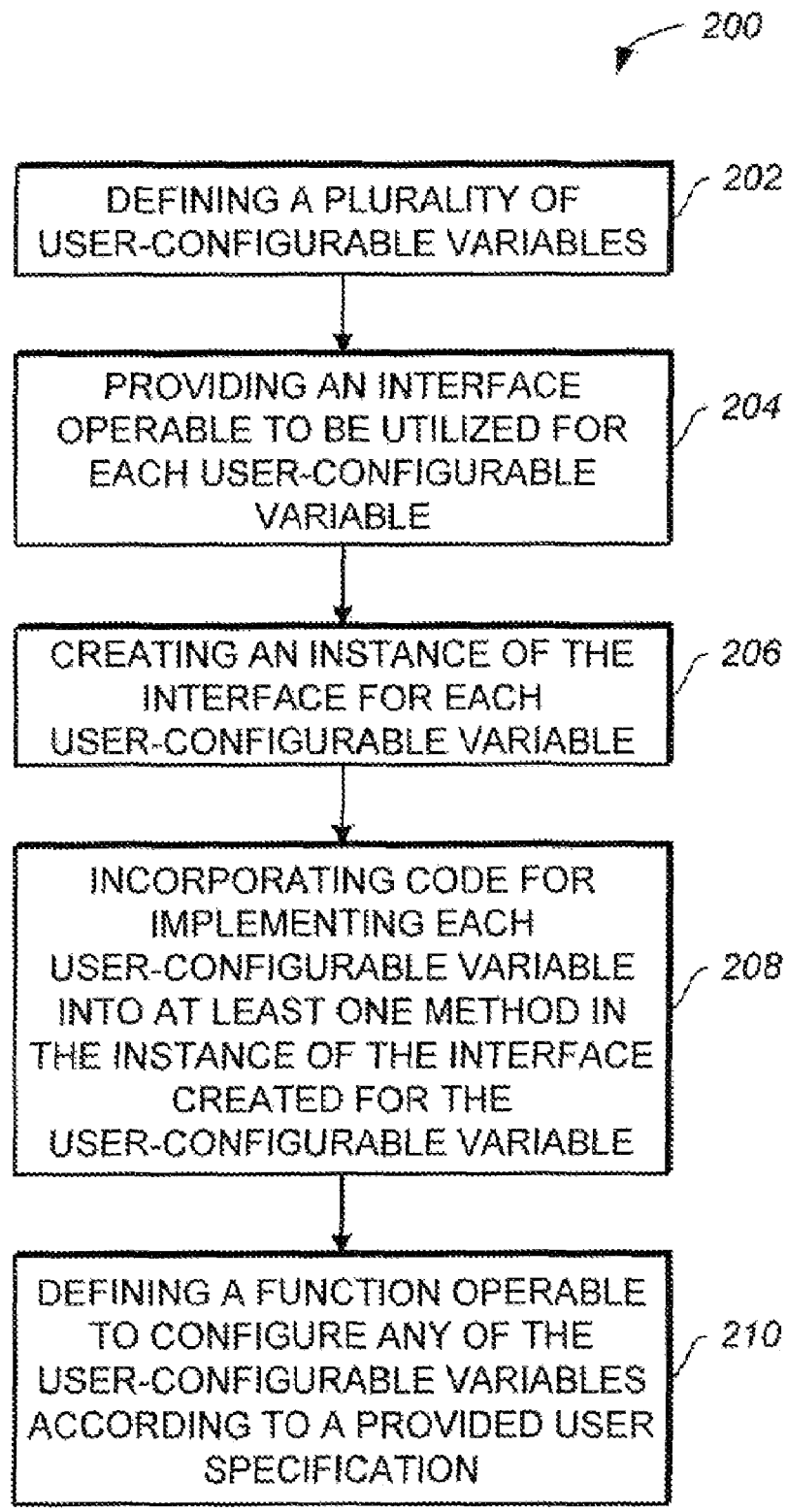
FIG. 2 illustrates a process flow of a method for managing user-configurable variables according to an implementation of the invention.

FIG. 2 illustrates a process 200 for managing user-configurable variables in computer programs according to an implementation of the invention. At 202, a plurality of user-configurable variables are defined in a computer program. The computer program may be written in an object-oriented programming language, such as C++ or Java. In one implementation, at least one of the plurality of user-configurable variables is defined in one of a plurality of classes defined in the computer program.

At 204, an interface operable to be utilized in the computer program for each of the plurality of user-configurable variables is provided. In the implementation, the interface includes at least one method. At 206, an instance of the interface is created in the computer program for each of the plurality of user-configurable variables.

Code for implementing each of the plurality of user-configurable variables is incorporated into the at least one method in the instance of the interface created for the corresponding user-configurable variable at 208. Code for implementing a given user-configurable variable may include special handling code for the given user-configurable variable, such as code for verifying certain conditions are satisfied.

At 210, a function operable to configure any of the plurality of user-configurable variables according to a provided user specification is defined in the computer program. The provided user specification specifies configuration information for one or more of the plurality of user-configurable variables. In one implementation, the one or more user-configurable variables specified in the user specification is less than all of the plurality of user-configurable variables defined in the computer program.

In the implementation of FIG. 2, for each of the one or more user-configurable variables specified in the provided user specification, the function is operable to execute the instance of the interface corresponding to the specified user-configurable variable to implement the specified user-configurable variable. Thus, each time the computer program is executed, the interface instances executed are limited to those created for the user-configurable variables specified in the provided user specification.

Figure 3:
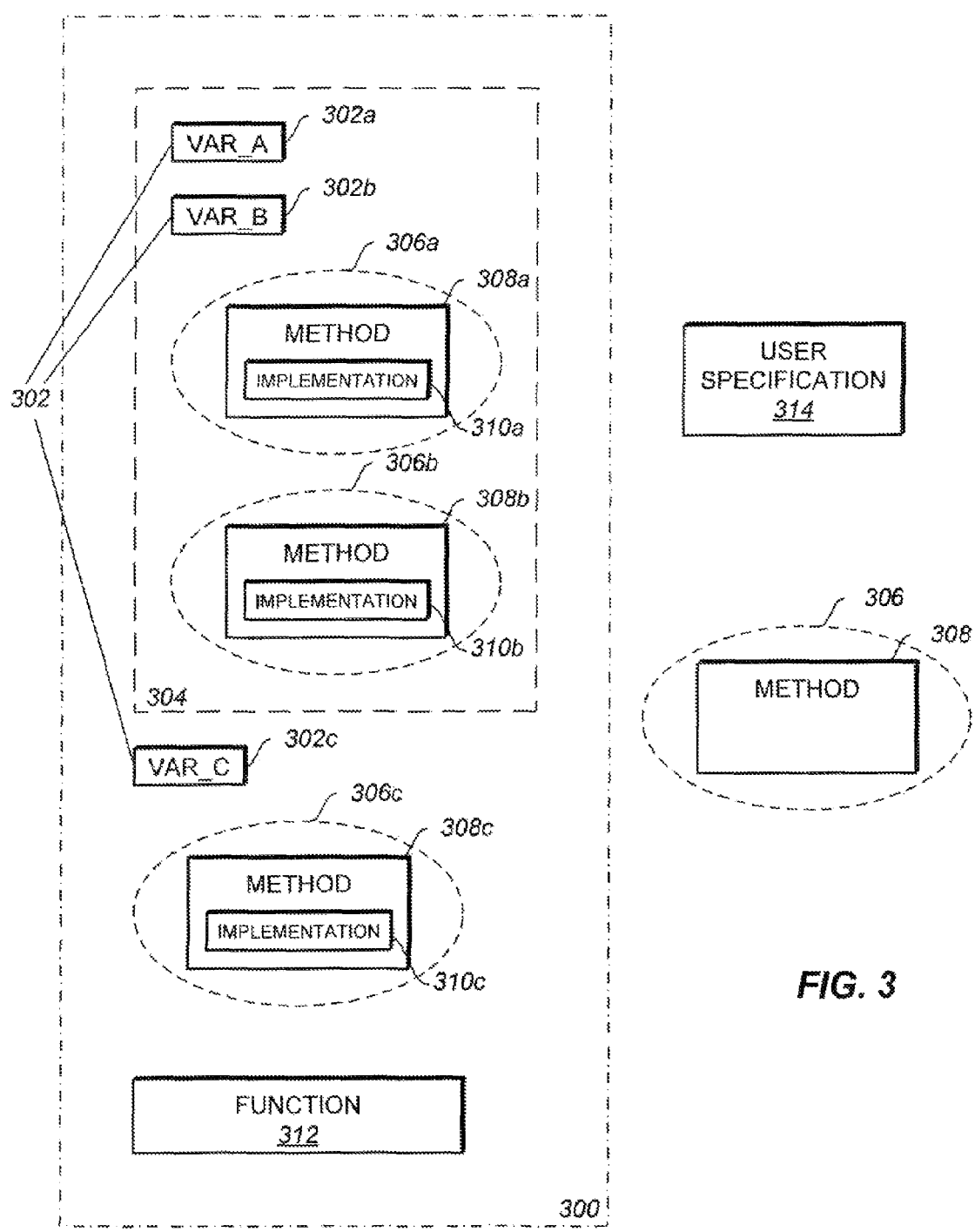
FIG. 3 shows a block diagram of a computer program according to an implementation of the invention.

Shown in FIG. 3 is a block diagram of a computer program 300 according to an implementation of the invention. In FIG. 3, user-configurable variables 302 have been defined in computer program 300. User-configurable variables 302a and 302b part of a class 304, User-configurable variable 302c is not part of any class.

An interface 306 is provided in FIG. 3. Interface 306 includes a method 308. An instance of interface 306 has been created for each of the user-configurable variables 302. Although interface 306 is illustrated as including only one method 308 in the implementation of FIG. 3, interface 306 may include additional methods in other implementations. Code 310a for implementing user-configurable variable 302a has been incorporated into method 308a of interface instance 306a. Code 310b for implementing user-configurable variable 302b has been incorporated into method 308b of interface instance 306b. Code 310c for implementing user-configurable variable 302c has been incorporated into method 308c for interface instance 306c.

A function 312 is also defined in computer program 300. Function 312 is operable to configure a given user-configurable variables 302 based on configuration information specified in a provided user specification 314 by executing the interface instance 306 corresponding to the given user-configurable variable 302. Other implementations of computer program 300 may include other variables (user-configurable and/or non-user configurable), classes, functions, etc.

Presented below is a sample pseudo-code for function 312 in FIG. 3. In the sample code, function 312 is named "configureVariables", the provided user specification 314 is named "properties", and the method 308 in interface 306 is named "configure".

```
void configureVariables (Properties properties)
{
    for each (var in properties)
        var.configure( );
}
```

In the sample-pseudo-code above, function 314 executes a given instance of interface 306 by calling the method 308 defined in the given instance of interface 306. As seen from FIG. 3 and the sample pseudo-code above, if user specification 314 only specifies configuration information for user-configurable variable 302c, then function 312 will only call method 308c of interface instance 306c when computer program 300 is executed. Thus, the inefficiencies associated with having to check all user-configurable variables each time a computer program is executed are eliminated.

Additionally, function 312 does not have to be modified if a new user-configurable variable is defined in computer program 300 or if one of the user-configurable variables 302 is removed from computer program 300. Hence, potential errors associated with having to modify a computer program each time a new user-configurable variable is defined or an existing user-configurable variable is removed are avoided. Code maintenance is also made easier and the overall number of lines of sources code is reduced.

Further, by providing an interface that can be used to efficiently set the properties or configuration parameters of a user-configurable variable, each user-configurable variable is able to handle itself independently and encapsulate its implementation from other user-configurable variables. The encapsulation of each user-configurable variable's implementation allows each user-configurable variable to incorporate a behavior that is independent and autonomous of the behavior of other user-configurable variables.

The invention can take the form of an entirely hardware implementation, an entirely software implementation, or an implementation containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-R/W).

Figure 4:
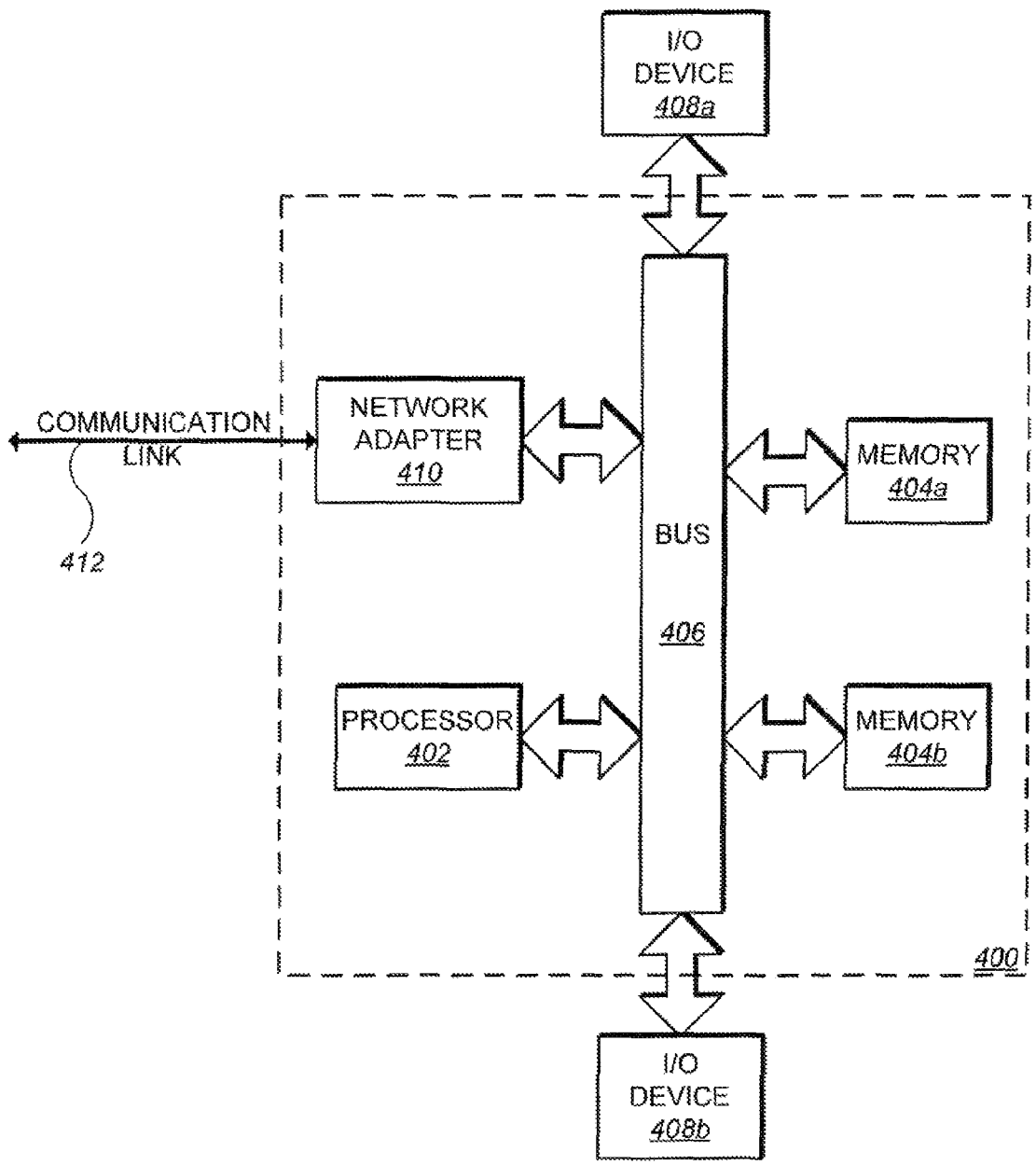
FIG. 4 illustrates a block diagram of a data processing system with which implementations of the invention can be implemented.

FIG. 4 depicts a data processing system 400 suitable for storing and/or executing program code. Data processing system 400 includes a processor 402 coupled to memory elements 404a-b through a system bus 406. In other implementations, data processing system 400 may include more than one processor and each processor may be coupled directly or indirectly to one or more memory elements through a system bus.

Memory elements 404a-b can include local memory employed during actual execution of the program code, bulk storage, and cache memories that provide temporary storage of at least some program code in order to reduce the number of times the code must be retrieved from bulk storage during execution. As shown, input/output or I/O devices 408a-b (including, but not limited to, keyboards, displays, pointing devices, etc.) are coupled to data processing system 400. I/O devices 408a-b may be coupled to data processing system 400 directly or indirectly through intervening I/O controllers (not shown).

In the implementation, a network adapter 410 is coupled to data processing system 400 to enable data processing system 400 to become coupled to other data processing systems or remote printers or storage devices through communication link 412. Communication link 412 can be a private or public network. Modems, cable modems, and Ethernet cards are just a few of the currently available types of network adapters.

While various implementations for managing user-configurable variables have been described, the technical scope of the present invention is not limited thereto. Various modifications or improvements can be added to the above implementations and those modification or improvement fall within the technical scope of the present invention.

What is claimed is:

1. A method for managing user-configurable variables, the method comprising:

defining a plurality of user-configurable variables in a computer program;

providing an interface operable to be utilized in the computer program for each of the plurality of user-configurable variables, the interface comprising one or more methods;

creating an instance of the interface in the computer program for each of the plurality of user-configurable variables;

incorporating code for implementing each of the plurality of user-configurable variables into at least one of the one or more in the instance of the interface created for each of the plurality of user-configurable variables; and defining a function in the computer program, the function being operable to configure any of the plurality of user-configurable variables according to a provided user specification, the provided user specification specifying configuration information for one or more of the plurality of user-configurable variables, wherein, for each of the one or more user-configurable variables specified in the provided user specification, the function is operable to execute the instance of the interface created for each of the one or more specified user-configurable variables to implement the specified user configurable variable, wherein responsive to the provided user specification specifying configuration information for the specified a certain user-configurable variable, the function calling only one of the one or more methods of the interface for the specified user-configurable variable when the computer program is executed, wherein the one or more user-configurable variables specified in the provided user specification is less than all of the plurality of user-configurable variables defined in the computer program.

2. The method of claim 1, wherein the computer program is written in an object-oriented programming language.

3. The method of claim 1, wherein at least one of the plurality of user-configurable variables is defined in one of a plurality of classes defined in the computer program.

4. The method of claim 1, wherein the code for implementing each of the plurality of user-configurable variables comprises code for special handling of the corresponding user-configurable variable.

5. A non-transitory computer readable medium, the computer readable medium including a computer readable program for managing user-configurable variables, wherein the computer readable program when executed on a computer causes the computer to:

define a plurality of user-configurable variables in a computer program;

provide an interface operable to be utilized in the computer program for each of the plurality of user-configurable variables, the interface comprising one or more methods;

create an instance of the interface in the computer program for each of the plurality of user-configurable variables;

incorporate code for implementing each of the plurality of user-configurable variables into at least one of the one or more methods in the instance of the interface created for each of the plurality of user-configurable variables; and define a function in the computer program, the function being operable to configure any of the plurality of user-configurable variables according to a provided user specification, the provided user specification specifying configuration information for one or more of the plurality of user-configurable variables, wherein, for each of the one or more user-configurable variables specified in the provided user specification, the function is operable to execute the instance of the interface created for each of the one or more specified user-configurable variables to implement the specified user configurable variable, wherein responsive to the provided user specification specifying only configuration information for the specified user-configurable variable, the function calling only one of the one or more methods of the interface for the specified user-configurable variable when the computer program is executed, wherein the one or more user-configurable variables specified in the provided user specification is less than all of the plurality of user-configurable variables defined in the computer program.

* * * * *